(12) United States Patent
Sato

(10) Patent No.: US 6,849,695 B2
(45) Date of Patent: Feb. 1, 2005

(54) PIPING MATERIAL

(75) Inventor: Sho Sato, Utsunomiya (JP)

(73) Assignee: General Electric Company, Pittfield, MA (US)

( * ) Notice: Subject to any disclaimer, the term of this patent is extended or adjusted under 35 U.S.C. 154(b) by 0 days.

(21) Appl. No.: 10/319,162

(22) Filed: Dec. 13, 2002

(65) Prior Publication Data

US 2003/0130421 A1 Jul. 10, 2003

(30) Foreign Application Priority Data

Dec. 19, 2001 (JP) ........................................ 2001-385933

(51) Int. Cl.$^7$ ............................................. C08F 283/08
(52) U.S. Cl. .................... 525/392; 525/333.3; 525/391; 525/905
(58) Field of Search ............................. 525/333.3, 391, 525/392, 905

(56) References Cited

U.S. PATENT DOCUMENTS

| | | |
|---|---|---|
| 4,946,897 A | 8/1990 | Aibizzati et al. |
| 5,034,441 A | 7/1991 | Nakano et al. |
| 5,164,479 A | 11/1992 | Funaki et al. |
| 5,200,454 A | 4/1993 | Nakano |
| 5,219,940 A | 6/1993 | Nakano |
| 5,241,015 A | 8/1993 | Chou |
| 5,252,693 A | 10/1993 | Ishihara et al. |
| 5,270,353 A | 12/1993 | Nakano et al. |
| 5,292,587 A | 3/1994 | Funaki et al. |
| 5,322,869 A | 6/1994 | Yamasaki et al. |
| 5,326,813 A | 7/1994 | Okada et al. |
| 5,391,603 A | 2/1995 | Wessel et al. |
| 5,391,611 A | 2/1995 | Funayama et al. |
| 5,395,890 A | 3/1995 | Nakano et al. |
| 5,418,275 A | 5/1995 | Okada et al. |
| 5,426,171 A | 6/1995 | Huang et al. |
| 5,444,126 A | 8/1995 | Okada |
| 5,475,061 A | 12/1995 | Machida et al. |
| 5,502,133 A | 3/1996 | Ishihara et al. |
| 5,543,462 A | 8/1996 | Okada et al. |
| 5,554,695 A | 9/1996 | Machida et al. |
| 5,703,164 A | 12/1997 | Nakano |
| 5,712,330 A | 1/1998 | Funayama et al. |
| 5,760,105 A | 6/1998 | Okada et al. |
| 5,777,021 A | 7/1998 | Nakano |
| 5,777,028 A | 7/1998 | Okada et al. |
| 5,891,951 A | 4/1999 | Nakano et al. |
| 5,990,217 A | 11/1999 | Nakano et al. |
| 6,005,050 A | 12/1999 | Okada et al. |
| 6,008,293 A | 12/1999 | Nakano et al. |
| 6,013,726 A | 1/2000 | Nakano et al. |
| 6,043,307 A | 3/2000 | Nakano et al. |
| 6,046,275 A | 4/2000 | Nakano et al. |
| 6,048,932 A | 4/2000 | Okada et al. |
| 6,051,655 A | 4/2000 | Nakano et al. |
| 6,087,435 A | 7/2000 | Nakano et al. |

FOREIGN PATENT DOCUMENTS

| | | |
|---|---|---|
| EP | 324398 | 7/1989 |
| EP | 557836 | 6/1990 |
| EP | 416 461 | 8/1990 |
| EP | 608 007 | 10/1990 |
| EP | 307488 | 7/1992 |
| EP | 733 675 | 4/1995 |
| EP | 736 364 | 7/2001 |
| JP | 1067899 B | 3/1989 |

OTHER PUBLICATIONS

JP63268709 Publication Date: Nov. 7, 1988. Production of Stereoregular Polystyrene. (Abstract Only).
JP62104818 Publication Date: May 15, 1987. Styrene Polymer. (Abstract Only).
JP8238717 Publication Date: Sep. 17, 1996. Resin–Coated Steel. (Abstract Only).
JP3279742 Publication Date: Dec. 10, 1991. Crosslinked Polyolefin Foam Pipe Cover. (Abstract Only).
JP11158366 Publication Date: Jun. 10, 1999. Compositions of Polyphenylene Ether Resin and Syndiotactic Polystyrene. (Abstract Only).
JP1996238717. Publication Date: Sep. 17, 1996. Resin Coating Steel Material. Machine Translation (42 pages).

Primary Examiner—Helen L. Pezzuto

(57) ABSTRACT

A resin composite covered piping material is provided having high heat resistance and excellent flame retardation property, anti-corrosion property, chemical resistance, insulation property and sufficiently high adhesion property with steel material and moreover, is highly economical.

The piping material having a covering layer of a resin composite wherein said resin composite comprises:

(A) 10 to 80 weight percent of polyphenylene ether resin,
(B) 10 to 80 weight percent of polystyrene polymer possessing syndiotactic structure, and
(C) 10 to 80 weight percent of polystyrene resin other than component (B) wherein the total of (A), (B) and (C) is 100 weight percent.

The resin composite described above may further contain an impact resistance improving agent (D) in a quantity of 1 to 50 parts by weight, with respect to the total of 100 parts by weight of components (A), (B) and (C).

11 Claims, No Drawings

PIPING MATERIAL

FIELD OF INVENTION

The present invention relates to a piping material that has surface covering of a resin protective layer. The piping material of the present invention can be used in any environment such as underground, outdoors, indoors and its application scope is extremely wide. The piping material is useful for transportation of gas, petroleum, water, etc.

Steel pipes have been protected against corrosion with a comparatively thick thermoplastic resin layer to provide a corrosion-proof protective layer. These pipes have been widely used as line pipes used for petroleum (crude oil), city gas supplying pipes, plant pipes, tap water or hot spring water supplying pipes, etc. In addition to steel pipes, steel pipe pickets, steel plates, shaped steel, bar steel etc., have also had their surface covered by a corrosion-proof resin.

The thermoplastic resin used in the protective layer of these steel materials have generally been polyolefins such as polyethylene, polypropylene, etc.; however, other resins such as vinyl chloride resins, different polyamide resins, different fluorine group resins, different saturated polyester resins etc. are also used depending on the usage environment and required properties.

For example, a steel pipe, as well as pipe couplings, covered with polyolefin group resin has been disclosed in Japan Patent Number Sho 52-94519, and polyolefin foamed resin used as pipe cover, having heat dimension change ratio as determined by JIS K6767, of less than 5% and Yang ratio of 12~25 kg/cm$^2$, has been disclosed in Japan Patent Number Hei 3-279742. However, these thermoplastic resins have their limitations and a resin possessing anti-corrosion property that can protect the steel pipe in any environment was not obtained. For example, the polyolefin material that is used in most of the cases for corrosion-proof covering of the steel material, has excellent chemical resistance; however, it has low heat resistance and weather resistance-properties and high combustibility. Also, its adhesion properties with the steel material is poor requiring the use of a functionalized polyolefin adhesive layer after application of an epoxy-coating primer. Thus, this material has the problem of the manufacturing process being complicated.

Vinyl chloride resin has excellent flame retardation property; however, it has low stability and hydrochloric acid is gradually released through degradation reactions. Polyamide and saturated polyester resins have moisture absorbance resulting in low electric resistance in certain environments such as when placed underground particularly in the damp soil. There also exists a possibility of the main material getting electrically corroded. Resin containing fluorine groups generally have excellent corrosion-proof properties, flame retardation properties, stability and electrical resistance; however, is extremely expensive and has poor adhesion properties with the steel material. Consequently, its corrosion-proof properties cannot be sufficiently realized. Furthermore, since it has high melting point, it has the problem of requiring a temperature of more than 400° C. for its application onto the steel pipe.

Use of protective layer formed from polyphenylene ether group resin has also been proposed. For example, steel pipe possessing a covering formed from polyphenylene ether resin composite possessing the composition containing (1) resin component formed from polyphenylene ether resin (A) contained in a quantity of 10~100 weight % and polystyrene polymer (B) contained in a quantity of 90~0 weight %: 100 parts by weight, (2) rubber component formed from polystyrene rubber polymer: 0~50 parts by weight and (3) flame retardation agent: 0~40 parts by weight, on the surface of the steel material, has been presented in the Japan Patent Number Hei 8-238717. However, the polyphenylene ether group resin described in this patent has low chemical resistance as compared to that of polyolefin group resin. Consequently, its use as a material having the necessary excellent corrosion-proof properties could not be obtained as a protective layer. Moreover, in the case of using polyphenylene ether group resin or its composite, there existed problems such as the cases of requiring adhesive layer and the process being complicated etc.

Since the polystyrene polymer possessing syndiotactic structure is crystalline, it has excellent chemical resistance and further, since its molecule structure contains styrene as the main constituent, it has satisfactory compatibility with other resins same as that of atactic type polystyrene polymers of the past. For example, a thermoplastic resin composite formed from 1~99 weight % of polystyrene polymer possessing syndiotactic structure and 99~1 weight % of thermoplastic resin other than polystyrene polymer possessing the syndiotactic structure mentioned above, has been presented in Japan Patent Number Hei 7-55995. The thermoplastic resin composite presented in this patent has reformed heat resistance as compared to the thermoplastic resin composites of the past; however, when used as a pipe covering, excellent flame resistance, anti-corrosion, weathering, chemical resistance and insulation properties could not be obtained.

Moreover, the applicant has proposed a resin composite containing (A) polyphenylene ether group resin, (B) polystyrene polymer possessing syndiotactic structure and (C) high impact styrene group resin, in which the quantity of (C) is 90~10 parts by weight with respect to 10~90 parts by weight of (A) and the quantity of (B) is more than 5 parts by weight and less than 60 parts by weight, with respect to total of more than 40 parts by weight and less than 95 parts by weight of (A) and (C), in Japan Patent Number Hei 11-158366. This resin composite has the characteristic of containing polyphenylene ether resin and maintains high dimension accuracy and excellent different properties and possesses practical chemical resistance.

SUMMARY OF THE INVENTION

The present invention provides a piping material coated with a resin composite wherein the resin composite has high heat resistance and excellent flame retardation property, anti-corrosion property, chemical resistance, insulation property and sufficiently high adhesion property with steel materials and moreover, is highly economical.

The piping material is coated on at least one side with a resin composite comprising:

(A) polyphenylene ether resin: 10~80 weight %, (B) polystyrene polymer possessing syndiotactic structure: 10~80 weight % and (C) polystyrene resin other than component (B): 10~80 weight %; wherein the total of (A), (B) and (C) is 100 weight %.

The resin composite provided above optionally contains an impact resistance agent (D) in a quantity of 1~50 parts by weight, with respect to the total of 100 parts by weight of (A), (B) and (C) mentioned above.

The polystyrene group resin (C) other than the component (B) described above is preferably a high impact polystyrene resin.

The covering by resin composite mentioned above is preferably a film formed from the resin composite or the injection molded product of resin composite.

DETAILED DESCRIPTION OF THE INVENTION

The piping material of the present invention is provided below.

The surface of the piping material of the present invention is covered by a resin composite containing (A) polyphenylene ether group resin, (B) polystyrene polymer possessing syndiotactic structure and (C) polystyrene resin other than component (B). In a preferred embodiment of the present invention, the surface is covered by a resin composite that further contains an impact resistance improving agent (D).

Polyphenylene ether group resin. In the present invention, well-known compounds can be used as polyphenylene ether resin (A) (PPE resin). Namely, PPE resin is a general term for the polymer possessing structural units shown by the general formula (I) given below:

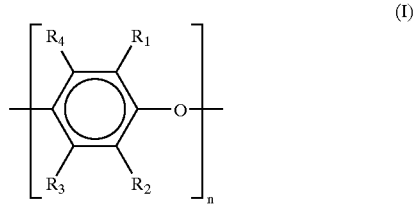

wherein each of $R_1$, $R_2$, $R_3$, and $R_4$ are hydrogen atom, halogen atom, hydrocarbon radical, substituted hydrocarbon radical, alkoxy radical, cyano radical, phenoxy radical or nitro radical and n is an integer showing the degree of polymerization.

The PPE resin can be used in form of an independent polymer formed from single type of structural units shown by the general formula given above or in the form of a copolymer formed by combining two or more than two types.

Additionally, each of the $R_1$, $R_2$, $R_3$, and $R_4$, radicals can be, for example, chlorine, bromine, iodine, methyl, ethyl, propyl, aryl, phenyl, benzyl, methyl benzyl, chloro methyl, bromo methyl, cyano ethyl, cyano, methoxy, ethoxy, phenoxy, nitro etc.

Specific examples of PPE resin include poly(2,6-dimethyl-1,4-phenylene)ether, poly(2, 6-diethyl-1,4-phenylene)ether, poly(2-methyl-6-ethyl-1,4-phenylene) ether, poly(2-methyl-6-propyl-1,4-phenylene)ether, poly(2,6-dipropyl-1,4-phenylene)ether, poly(2-ethyl-6-propyl-1,4-phenylene)ether, poly(2,6-dimethoxy-1,4-phenylene)ether, poly(2,6-dichloro methyl-1,4-phenylene)ether, poly(2,6-dibromo methyl-1,4-phenylene)ether, poly(2,6-diphenyl-1,4-phenylene)ether, poly(2,6-ditoluyl-1,4-phenylene)ether, poly(2,6-dichloro-1,4-phenylene)ether, poly(2,6-dibenzyl-1,4-phenylene)ether, poly(2, 5-dimethyl-1,4-phenylene) ether etc.

The preferred PPE resin is a polymer having alkyl radical, particularly, the alkyl radical having carbon atoms from 1 to 4 as $R_1$ and $R_2$ in the formula (I) given above and n is desired to be more than 50. Additionally, PPE resin that are copolymers of the polymers provided above such as those containing tri-substituted alkyl phenol, e.g., the copolymer containing the radical derived from 2, 3, 6-tri methyl phenol are also useful. Copolymers formed by grafting styrene compounds onto PPE resins can also be used. Examples of the styrene compound used in the polymerization of styrene compound grafted PPE resin, include styrene, α—methyl styrene, vinyl toluene, chloro styrene etc.

(B) Polystyrene group polymer possessing syndiotactic structure] The polystyrene polymer possessing syndiotactic structure (B) is another component in the resin composite used in the present invention.

As used herein, syndiotactic structure means solid (steric) structure in which phenyl radical or substituted phenyl radical has been situated on mutually opposite direction with respect to the main chain formed from carbon—carbon bond. Its tacticity is determined by nuclear magnetic resonance method ($^{13}C$—NMR method). Tacticity measured by $^{13}C$—NMR method can be shown by the proportion of presence of multiple units of connecting structural units, for example, diado in case of 2 units, triado in case of 3 units and pentado in case of 5 units.

In the present invention, the polystyrene polymer possessing syndiotactic structure possesses syndiotacticity, in terms of diado, of more than 75%, more preferably, more than 85% or in terms of racemic-pentado, of more than 30%, more preferably, more than 50%, is desired to be used.

Examples of polystyrene polymer possessing syndiotactic structure (B) include polystyrene, poly(alkyl styrene), poly(halogenated styrene), poly(alkoxy styrene), poly(vinyl benzoic acid ester) and their mixture or a copolymer containing these as main component can be used.

Examples of the poly(alkyl styrene) mentioned above, poly (methyl styrene), poly(ethyl styrene), poly(iso propyl styrene), poly(tertiary butyl styrene) etc. can be given. Moreover, as regards the poly(halogenated styrene), poly (chloro styrene), poly(bromo styrene), poly(fluoro styrene) etc. can be given. Further examples include poly(alkoxy styrene), poly(methoxy styrene), poly(ethoxy styrene) etc. From among these examples, polystyrene, poly(p-methyl styrene), poly(m-methyl styrene), poly(p-tertiary butyl styrene), poly(p-chloro styrene), poly(m-chloro styrene), poly(p-fluoro styrene), as well as, copolymers of styrene and p-methyl styrene are particularly preferred as the polystyrene polymer possessing syndiotactic structure.

There is no particular restriction over the molecular weight of polystyrene polymer possessing syndiotactic structure (B); however, in terms of weight average molecular weight, it is preferred to be more than 10,000, more preferably, more than 50,000. If the weight average molecular weight of this polystyrene resin is less than 10,000, then the chemical resistance tends to be insufficient. Furthermore, the range of its molecular weight distribution is also not limited to just within these boundaries and resins having different molecular weight distribution can be used. The melting point of the polystyrene polymer possessing syndiotactic structure (B) is between 200~310° C. and thus, it has excellent heat resistance as compared to polystyrene polymer having atactic structure of the past.

This polystyrene polymer possessing syndiotactic structure (B) can be manufactured by polymerizing styrene group monomer (monomer corresponding to styrene group resin mentioned above) in the presence or absence of inert hydrocarbon solvent, using titanium compound and condensation product (condensate) of water and tri alkyl aluminium, as catalyst (for example, Japan Patent Numbers Sho 62-104818 and Sho 63-268709). Commercially polystyrene polymer possessing syndiotactic structure can be used.

Moreover, polystyrene polymer possessing syndiotactic structure (B) can be functionalized by functionalization agent possessing a polar radical. Example of the polar radical include acid hydride, carbonyl radical, acid anhydride, acid amide, carboxylate, acid amide, sulfone radical, nitrile radical, cyano radical, iso cyanate, amino radical, imide radical, hydroxide radical, epoxy radical, oxazoline radical, thiole radical, etc. Acid anhydride and epoxy radical are particularly preferred as the polar radical and in acid anhydride, maleic acid anhydride radical are especially preferred.

(C) Polystyrene group resin other than component (B). The polystyrene resin (C) other than the polystyrene polymer possessing syndiotactic structure (B) mentioned above is another component of the resin composite used in the present invention that covers the piping material.

There is no particular restriction over this polystyrene resin (C) and examples include polystyrene having atactic structure, polystyrene having isotactic structure, AS resin, ABS resin, as well as graft polymers of elastomer (rubber substance) and polystyrene resin (high impact styrene group resin) etc. High impact polystyrene resin is especially preferred to be used as the polystyrene resin (C) of the present invention. When high impact polystyrene resin is used as component (C), then the strength of the resin covering obtained from this resin composite improves.

These high impact polystyrene resins are well known and are graft polymer of elastomer (rubber substance) and a part of polystyrene resin. This graft polymer [elastomer (rubber substance)/styrene group resin], is stabilized and dispersed in polystyrene resin, in the form of what is commonly called as racemic structure, at the size of approximately 0.1~4.0 μm, at the time of reaction and solidification. These high impact polystyrene resins are not temporarily reacted and dispersed at the time of plastic reaction, like addition type thermoplastic elastomer, for example, styrene-butadiene-styrene copolymer (SBS) and hydrogenated styrene-butadiene-styrene block copolymer (SEBS).

These high impact polystyrene resins can be manufactured by dissolving elastomer (rubber substance) in styrene monomer and then, carrying out polymerization by any desired polymerization method. Polymerization can be carried out batch wise or continuously. Examples of the polymerization methods include emulsification polymerization method, lump state polymerization method, lump state suspension 2-step method etc.

The styrene monomer is shown by the general formula (II) given below:

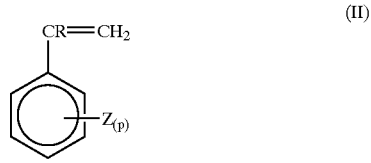

(II)

wherein R is hydrogen atom or alkyl radical having 1 to 4 carbon atoms, Z is halogen atom or substitution radical that is alkyl radical having 1 to 4 carbon atoms and p is an integer from 0 to 5.

Examples of the elastomer (rubber substance) mentioned above include polybutadiene, poly isoprene, butyl rubber, EPDM, ethylene-propylene copolymer, natural rubber, natural or synthetic elastomer, such as epichloro hydrine. Among these examples, polybutadiene is especially preferred.

In the present invention, high impact polystyrene (using styrene and polybutadiene) is often preferred as polystyrene resin (C).

High impact polystyrene resin used in the present invention can be procured as commercial product, for example, Dyarex HT-series marketed by Mitsubishi Kagaku (Mitsubishi Chemicals) (company), Topolex series marketed by Nippon Polystyrene (Japan Polystyrene) (company) etc. can be used.

Impact resistance improving agent. An impact resistance improving agent (D) is used in a preferred embodiment of the resin composite that covers piping material of the present invention. This optional impact resistance improving material (D) is added to improve the impact resistance or toughness of the obtained resin composite.

Examples of the impact resistance improving agent (D) used in the present invention, include styrene-rubber block polymers such as styrene-butadiene copolymer or its hydrogenated product, styrene-isoprene copolymer or its hydrogenated product, styrene-butylene copolymer, styrene-(ethylene-propylene) copolymer, ethylene-propylene-styrene copolymer etc., ethylene-α olefin group rubber polymer such as ethylene-propylene copolymer, ethylene-butene copolymer, ethylene-propylene-non-conjugated diene copolymer etc., natural rubber, butadiene polymer, isoprene polymer, chloro butadiene polymer, butadiene-acrylonitrile copolymer, isobutylene polymer, isobutylene-butadiene copolymer, isobutylene-isoprene copolymer, per fluoro rubber, fluorine rubber, chloroprene rubber, butyl rubber, silicon rubber, thiokol rubber, poly-sulfide rubber, polyurethane rubber, polyether rubber, epichloro hydrine rubber, polyester elastomer, polyamide elastomer etc.

Among these, polystyrene rubber block polymers such as styrene-butadiene copolymer or its hydrogenated product, styrene-isoprene copolymer or its hydrogenated product, styrene-butylene copolymer, styrene-(ethylene-propylene) copolymer, ethylene-propylene-styrene copolymer etc. and ethylene-α-olefin group rubber polymer such as ethylene-propylene copolymer, ethylene-butene copolymer, ethylene-propylene-non-conjugated diene copolymer etc. are preferred and styrene-butadiene copolymer or its hydrogenated product are particularly preferred.

The polystyrene rubber block polymer mentioned above is an elastomeric random copolymer or block copolymer of vinyl aromatic compound represented by styrene, and conjugated diene.

For example, the impact resistance improving agent (D) block copolymer divided into hard block of polystyrene and soft block of derived from the diene group is generally preferred as it has high rubber elasticity. For example, the polystyrene block copolymer rubber, block copolymers possessing styrene block (S) and butadiene block (B) (for example, linear block types such as SB, SBS, SBSBS and radial block type copolymers) are useful. Moreover, functionalized rubber made by incorporating a functionalized monomer containing functional radicals such as acid, epoxy etc. can also be used.

Many methods have been proposed as the manufacturing methods of the polystyrene block copolymer rubber and include, for example, the method described in Japan Patent Number Sho 40-2798. In this method, vinyl aromatic compound and conjugated diene are subjected to successive polymerization reaction in an inert solvent using lithium catalyst or Ziegler type catalyst. Moreover, molecules can be bonded by carrying out a coupling reaction after successive polymerization, if desired. Polystyrene block copolymer rubber is often manufactured by this reaction. Furthermore, in the case of manufacturing polystyrene hydrogenated block copolymer rubber, hydrogenation is performed after carrying out polymerization mentioned above. The ratio hydrogenation is desired to be at least 50%, desirably, more than 80% of conjugated diene group soft block. Preferably, less than 25% of the aromatic unsaturated bond present in the styrene group hard block is hydrogenated.

Examples of the impact resistance improving agent (D), styrene-butadiene group hydrogenated copolymer having content of structural units derived from styrene (styrene content) of more than 60 weight % is preferred and styrene-butadiene group hydrogenated copolymer having styrene content of more than 65 weight % is particularly preferred to be used. For example, the styrene-butadiene group hydrogenated copolymer, hydrogenated styrene-butadiene-styrene tri block copolymer (SEBS) (Tuftec H1043; Asahi Kasei (Asahi Synthetic Chemicals) etc. are known.

The number-average molecular weight of the block copolymer rubber used as polystyrene block copolymer rubber is preferred to be between 10,000 to 1,000,000, more preferably, between 20,000 to 300,000. The number-average molecular weight of vinyl aromatic hard block present in the block copolymer rubber should be within the range from 1,000 to 200,000, preferably, it should be within the range from 2,000 to 100,000, and number-average molecular weight of conjugated diene soft block should be within the range from 1,000 to 200,000, preferably, it should be within the range from 2,000 to 100,000. Furthermore, the weight ratio of vinyl aromatic hard block/conjugated diene soft block should be within the range from 2/98 to 60/40, preferably, it should be within the range from 10/90 to 40/60.

Examples of the ethylene-α-olefin rubber polymer used as impact resistance improving agent (D), include polymers having ethylene content within the range from 30 to 93 mole %, desirably, within the range from 35 to 90 mole % is often preferred. Polymers having this ethylene content have excellent effect of improving the impact resistance of the composite. Moreover, if ethylene content of ethylene-α-olefin copolymer mentioned above becomes more than 93 mole % or less than 30 mole %, the ethylene-α-olefin group rubber copolymer becomes highly crystalline and effect of improving the impact resistance of the composite becomes insufficient.

Moreover, melt flow rate of ethylene-α-olefin group rubber copolymer mentioned above, occurring at 190° C. [MFR, value measured at the load of 2160 g, at 190° C. (ASTM D-1238E conditions)] is preferred to be within the range from 0.1 to 80 g/10 minutes, preferrably it should be within the range from 0.2 to 50 g/10 minutes. If MFR of ethylene-α-olefin group rubber copolymer mentioned above is within the ranges described above, then impact resistance can be improved sufficiently.

The density of ethylene-α-olefin rubber copolymer described above is preferred to be less than 0.90 g/cm$^3$, more preferably, it should be within the range from 0.85 to 0.89 g/cm$^3$. Furthermore, less crystalline or non-crystalline material is preferably used as the ethylene-α-olefin group rubber copolymer mentioned above and its crystallization density is preferably within the range from 0 to 50%, more preferably, within the range from 0 to 40%.

The α-olefin component units containing ethylene-α-olefin rubber copolymer described above are α-olefin having 3 to 18 carbon atoms, and include for example, propylene, 1-butene, 1-hexene, 4-methyl-1-pentene, 1-decene. These can be used as single type or mixture of two or more than two types. The ethylene-α-olefin rubber copolymer described above is generally a copolymer of ethylene component and α-olefin component; however, it can contain diene component in a proportion of less than 5 mole %. Examples of diene component include di cyclo pentadiene, ethylidene norbornene, etc.

Composition of resin composite. The resin composite used in the present invention comprises the components (A) to (C) in a quantity of:

(A) polyphenylene ether resin: 10 to 80 weight %

(B) polystyrene polymer possessing syndiotactic structure: 10 to 80 weight %, and (C) polystyrene resin other than component (B): 10 to 80 weight %; wherein the total of the components (A), (B) and (C) is 100 weight %.

The resin composite containing (A) polyphenylene ether group resin, (B) polystyrene group polymer possessing syndiotactic structure and (C) polystyrene group resin other than component (B) affords a covering layer having high chemical resistance, heat resistance, weather withstanding property, strength, flame retardation property and excellent anti-corrosion property. Additionally, the resin composite containing (A)~(C) can be used without an adhesive layer and therefore, the application process becomes simple and economically excellent.

In preferred embodiments, the resin composite of the present invention is substantially free of polyolefin resin. Therefore, a covering layer having improved strength compared to that of the prior can be obtained.

The total of components (A), (B) and (C) based upon 100 weight % of the same, (A) is preferably within the range from 10 to 80 weight %, more preferably within the range from 10 to 70 weight % and most preferably within the range from 20 to 50 weight %, (B) is preferably within the range from 10 to 80 weight %, more preferably within the range from 10 to 70 weight % and most preferably within the range from 20 to 50 weight % and (C) is preferably within the range from 10 to 80 weight %, more preferably within the range from 20 to 80 weight % and further preferably within the range from 30 to 60 weight %. If the quantity of the polyphenylene ether resin (A) is less than the range provided above, then heat resistance of the resin composite becomes insufficient whereas if it is more than the range mentioned above, then flowability deteriorates. Moreover, if the quantity of polystyrene polymer possessing syndiotactic structure (B) is less than the range mentioned above, then solvent resistance and flowability becomes diminished whereas if it is more than the range mentioned above, then heat resistance is reduced. Additionally, if the quantity of polystyrene resin other than (B) is less than the range mentioned above, then flowability becomes reduced and whereas if it is more than the range mentioned above, then mechanical strength and heat resistance are lowered.

The resin composite used in the present invention optionally further contains an impact resistance improving agent (D). This impact resistance improving agent (D) is preferably in a quantity of 1 to 50 parts by weight, more preferably 2 to 40 parts by weight and even more preferably 3 to 30 parts by weight, with respect to the total of 100 parts by weight of (A), (B) and (C) described above. If it is contained in a quantity provided above, then a covering layer having excellent impact resistance can be formed.

Other than the components (A)~(D) described above, other polymer compounds or different additives can be blended, subject to the condition that the desired properties of the present invention is not lost.

Examples of the other polymer compounds that may be present in the resin composite include copolymers of α-olefin and vinyl unimer copolymerizable with it (for example, acrylate variety, methacrylate variety, vinyl acetate, styrene, acrylonitrile, glycidyl (metha) acrylate etc.); adduct polymer type polymer compounds such as polyvinyl chloride, polyethyl methacrylate, polyvinyl acetate, polyvinyl pyridine, polyvinyl carbazole, polyacryl amide, poly acrylonitrile etc.; condensate type polymer compounds such as polycarbonate, polysulfone, polyether sulfone, polyethylene terephthalate, polybutylene terephthalate, polyallylene ester, polyphenylene sulfide, polyamide, poly acetal etc.; silicon resin, fluorine resin, polyimide, polyamide imide etc.; as well as different heat hardening type resins such as phenol resin, alkyd resin, unsaturated polyester resin, di allyl phthalate resin etc. The blending quantity of these other polymer compounds is preferred to be less than 500 parts by weight, more preferably less than 100 parts by weight with respect to total of 100 parts by weight of the components (A)~(C).

Additionally, fillers can be blended with the resin composite used in the present invention to impart reinforcement. Examples of fillers that can be used include fibers used for reinforcement such as glass fibers, carbon fibers, aramid fibers, metal fibers of aluminium or stainless etc. and whisker etc.; and inorganic fillers such as silica, alumina, calcium carbonate, talc, mica, clay, kaolin, magnesium sulfate, carbon black, $TiO_2$, ZnO, $Sb_2O_3$ etc. The blending quantity of these fillers is preferred to be less than 100 parts by weight, more preferably less than 50 parts by weight with respect to total of 100 parts by weight of the components (A)~(C).

Other additives that can be blended include halogen group and phosphate group flame retardation agents, flame retardation supporting agent such as $Sb_2O_3$ etc., lubricants such as mineral oil, plasticizer such as phthalic acid ester etc., further, dyestuff, pigment, antistatic agent, antioxidant, weather resistance imparting agent etc. There is no particular restriction over the quantity of addition of these additives as long as it is within such range that flowability and kneading properties of the resin composite are not obstructed.

Preparation of resin composite. There is no particular restriction over the manufacturing method of the resin composite used in the present invention and common methods can be used. However, common melt mixing methods are preferably used. Small quantity of solvent can also be used; however, it is generally not necessary. Examples of the mixing equipment include particularly, extruder, bombarding mixer, roller, kneader etc. These devices can be operated batch-wise or continuously. Additionally, there is no particular restriction over the order of mixing of components.

For example, in the case of carrying out melt kneading by extruder, either all the components can be compounded and kneaded or multiple feed ports can be used in one extruder with the components sequentially fed. The resin composite obtained by carrying out melt kneading can be directly used for covering the piping material of the present invention as it is or it is first cooled to solidification and it made into the forms such as pellet, powder etc. and then, additives are once again added as per requirement and it is once again melted.

Covering of piping material. The covering of pipe material is done by using resin composite described above and can be carried out by using any desired covering method that is used for resin covering of steel material known in the art.

Examples of the pipe part material include pipe used for tap water, pipe used for gas etc. and it can be a single pipe or composed of coupled pipes. The piping material used in the present invention can be formed from steel material or concrete and further, it can be made from resins such as vinyl chloride etc.

The piping material to be covered can be pre-treated by common methods. For example, in the case of steel material, examples of the pre-treatment include treatments such as fat removing, acid washing, shot blast etc. carried out for surface cleaning, chromate treatment or phosphoric acid salt treatment etc. carried out for improving anti corrosion property and various combinations of these.

An adhesive layer can be formed between the covering layer and piping material, corresponding to the adhesion property of the covering resin composite, in order to increase adhesion strength, as required. This adhesive layer can be of the primer layer that is formed by coating for example, epoxy resin primer on the surface of the piping material, then backing and drying it. Also, an adhesive thermoplastic resin such as a thin film of polyethylene functionalized by organic acids such as maleic acid, fumaric acid etc. or organic acid anhydride can be covered on the piping material beforehand as the adhesive layer.

Examples of methods of covering done by the resin composite described above include (i) film covering method in which the resin composite is molded into film form by melting it and then carrying out extrusion molding, and after this, covering the pipe part material by this film, (ii) extrusion covering method in which the melted resin composite obtained from the extruder is extruded into film form and then, it is covered on the surface of the piping material such as steel pipe etc., (iii) injection molding method in which covering layer of the resin composite is directly formed (on the surface of piping material) by injection molding (insert molding of piping material), (iv) flow dipping method in which the pre-heated piping material is dipped into the fluid layer made into the fluid state by carrying out air shooting on powder form resin composite and then, covering the resin composite, (v) spray covering method in which the powder form resin composite is sprayed on the pre-heated piping material by using an electrostatic powder gun, (vi) coating method in which the resin composite mentioned above is dissolved in a non-aqueous solvent in which it is soluble and then, the surface coat is coated and covered etc. Particularly, for covering of pipe having small diameter, film covering method, extrusion covering method, injection molding method as well as fluid dipping method are appropriate from the point of productivity. In case of extrusion covering method, any desired styles such as circular die style or T die style can be used; however, generally circular die style is appropriate to be used in case of small sized piping material such as pipe having small diameter etc. and T die style is appropriate to be used in case of large sized piping material such as pipe having large diameter. Moreover, fluid dipping method or spray covering methods is appropriate for covering the piping material having irregular shape such as pipe coupling.

Preferably in the present invention, covering done by using resin composite described above is film formed from the resin composite or injection molded product of the resin composite.

There is no particular restriction over the position of the covering part of the piping material of the present invention. Namely, the entire surface of the piping material is not necessarily required to be covered with PPE resin composite and at least a part of the surface should be covered. For example, in case of straight pipe, generally the external surface is covered with the resin composite of the present invention. The internal surface can be un-treated or treatments other than resin coating can be performed and further, the internal surface can also be covered with the resin composite.

There is no particular limitation over the thickness of the covering layer as long as it is the thickness that does not get damaged easily and generally, it is within the range from 0.05 to 20 mm, preferably, within the range from 0.1 to 10 mm.

There is no particular limitation over the application of piping material of the present invention, however, since it has excellent anti-corrosion property, weather withstanding property, flame retardation property, impact resistance and strength, it can be used in different environments, particularly it is most appropriate to be used in covering of gas pipe having small diameter. Namely, the gas pipe having small diameter can be used underground, indoors or outdoors as the underground service pipe of a house or building as well as overhead piping used indoors. In the past, polyethylene covered steel pipes, zinc plated steel pipes, salt covered steel pipes were selected based upon the place used. If the covered pipe part material of the present invention is used, then all the places can be dealt with using one type of covered piping which is advantageous from the point of manufacturing and economy.

If the present invention is used, then highly economical resin covered pipe material having high strength, excellent heat resistance, flame retardation property, anti-corrosion property, weather withstanding property, chemical resistance, insulation property and sufficiently high adhesion property with steel material, can be obtained. This resin covered pipe material has high anti-corrosion property due to high adhesion strength between covered resin and steel material, and thus, a high degree of anti-corrosion property can be exhibited in any environment such as underground, outdoors, indoors.

Examples. The present invention has been explained with additional details with the help of the following examples. However, the present invention is not restricted only to these examples.

Component (A): Polyphenylene ether resin (PPE) Poly (2,6-dimethyl-1,4-phenylene)ether having intrinsic viscosity of 0.46 dl/g (Nippon GE Plastics Kabushiki Kaisha (GE Plastics Japan Co. Ltd.)).

Component (B): Polystyrene polymer possessing syndiotactic structure Xarec 130ZC of Idemitsu Sekiyu Kagaku Sha (Idemitsu Petrochemicals Company), molecular weight 180000, syndiotacticity expressed by racemi-pentado measured by $^{13}$C—NMR analysis, 98%.

Component (C): Polystyrene resin other than component (B) High impact styrene resin (HIPS) (870ST, Nippon Polystyrene (Japan Polystyrene) (company) make)

Component (D): Compatibility agent Hydrogenated styrene-butadiene-styrene tri block copolymer (SEBS) having total styrene content of 33% (Kraton Shell Japan Company)

Practical Examples 1~4, Comparative Examples 1~3

Each of the materials described above was used to prepare the compositions provided in Table 1 using a biaxial extruder at 200 rpm with the barrel set temperatures being between 270 to 280° C. and pellets were prepared by cutting.

The pellets prepared were used and test plates were molded by 80 ton injection molding machine of Toyo Kikai Kinzoku Kabushiki Kaisha (Toyo Machinery and Metals Co. Ltd.). The molding conditions were set at barrel temperature of 280° C. and mold temperature of 50° C. The tests given below were carried out using the obtained test plates. The results have been presented in table 1 given below.

Load Bending Temperature

It was measured using ¼ inch thick test plate, as per ASTM D648 at the load of 18.6 kg/cm$^2$.

Izod Impact Strength

It was measured using 3.2 mm thick test plate, in the state of notch attached as per ASTM D256.

Tensile Strength

It was measured as per ASTM D638.

Bending Strength

It was measured as per ASTM D638.

Modulus of Bending Elasticity

It was measured as per ASTM D790, using 1.6 mm thick test plate.

Chemical Resistance Test

The ASTM-1 test plates obtained by injection molding each of the samples were fixed in the state of 1% strain in a strain tool and rust prevention agent and cutting oil were coated on its surface. It was kept undisturbed at normal temperature as well as at 65° C. for 72 hours after which the presence of generation of cracks on the surface of the test material was visually observed. The rust prevention agent was CRC5-56 obtained from Kure Industries, the cutting oil was Yushiro Cut UB75 obtained from Yushiro Kagaku (Yushiro Chemicals).

Evaluation Standards:

○: No cracks on the surface of test plate

X: Cracks present on the surface of test plate

Evaluation of piping material. Resin covering was carried out on the pipe coupling using pipes having diameter of 1.5 inch by an insert molding method using the resin composite described above and drop test and chemical resistance test (rust prevention agent and cutting oil) was carried out using the obtained piping material as the final product. The same rust prevention agent and cutting oil were used in the comparative examples.

As a result of this, in case of Examples 1 to 4, no cracks or warps of resin covering was observed in any of the tests of drop test and chemical resistance test and it sufficiently withstood as the covering of the pipe. On the other hand, in the Comparative Examples 1 and 2, cracks generated in the chemical resistance test. In the Comparative Example 3, the resin covering warped in the drop test and it did not withstand practical testing as the piping material.

TABLE 1

| | | Example 1 | Example 2 | Example 3 | Example 4 | Comparative example 1 | Comparative example 2 | Comparative example 3 |
|---|---|---|---|---|---|---|---|---|
| 1. Composition (parts by weight) | | | | | | | | |
| (A) PPE | | 20 | 20 | 40 | 40 | 20 | 20 | 20 |
| (B) SPS | | 20 | 20 | 40 | 40 | | 5 | 80 |
| (C) HIPS | | 60 | 50 | 20 | 10 | 80 | 75 | |
| (D) SEBS | | | 10 | | 10 | | | |
| 2. Evaluation of molded material | | | | | | | | |
| Load bending temperature | ° C. | 101 | 102 | 118 | 120 | 100 | 101 | 103 |
| Izod impact strength | kg.cm/cm | 10 | 23 | 6 | 19 | 13 | 12 | 4 |
| Tensile strength | Kg/cm$^2$ | 410 | 370 | 660 | 580 | 350 | 370 | 670 |
| Bending strength | Kg/cm$^2$ | 760 | 660 | 1120 | 950 | 620 | 640 | 950 |
| Modulus of bending elasticity | Kg/cm$^2$ | 23300 | 19600 | 29100 | 25000 | 20400 | 21100 | 32500 |
| Chemical resistance | Rust prevention agent | ○ | ○ | ○ | ○ | X | X | ○ |
| | Cutting oil | ○ | ○ | ○ | ○ | X | X | ○ |

It can be understood from the result given above that the piping material of the present invention has excellent chemical resistance, impact strength and tensile strength.

What is claimed is:

1. A piping material comprising a covering layer of a resin composite disposed on at least a portion of a pipe wherein said resin composite comprises:
    (A) 10 to 80 weight percent of polyphenylene ether resin,
    (B) 10 to 80 weight percent of polystyrene polymer possessing syndiotactic structure, and
    (C) 10 to 80 weight percent of high impact polystyrene, wherein the total of (A), (B) and (C) is 100 weight percent.

2. The piping material of claim 1, wherein the resin composite further comprises an impact resistance improving agent (D) in a quantity of from 1 to 50 parts by weight, with respect to the total of 100 parts by weight of components (A), (B) and (C).

3. The piping material of claim 1, wherein the covering layer is applied through a film covering method or an injection molding method.

4. The piping material of claim 2, wherein component CD) is a polystyrene block copolymer elastomer resin.

5. The piping material of claim 1, wherein component (B) has a syndiotacticity in terms of diado of more than 75%.

6. The piping material of claim 1, wherein the resin composite comprises:
- (A) 10 to 70 weight percent of polyphenylene ether resin,
- (B) 10 to 70 weight percent of polystyrene polymer possessing syndiotactic structure, and
- (C) 20 to 80 weight percent of high impact polystyrene resin, wherein the total of (A), (B) and (C) is 100 weight percent.

7. The piping material of claim 6, further comprising 2 to 40 parts by weight of polystyrene block copolymer elastomer resin based upon 100 parts of components (A), (B) and (C).

8. The piping material of claim 6, further comprising an adhesive layer disposed between the covering layer and the pipe.

9. The piping material of claim 1, wherein the covering layer is on at least part of an exterior surface of the piping material.

10. The piping material of claim 1, wherein the covering layer has a thickness within the range of 0.05 to 20 mm.

11. A piping material comprising a covering layer of a resin composite disposed on at least a portion of a pipe wherein said resin composite comprises:
- (D) 10 to 80 weight percent of polyphenylene ether resin selected from the group consisting of poly(2,6-di methyl-1,4-phenylene)ether, poly(2,6-di ethyl-1,4-phenylene)ether, poly(2-methyl-6-ethyl-1,4-phenylene)ether, poly(2-methyl-6-propyl-1,4-phenylene)ether, poly(2,6-di propyl-1,4-phenylene) ether, poly(2-ethyl-6-propyl-1,4-phenylene)ether, poly(2,6-di methoxy-1,4-phenylene)ether, poly(2,6-di chloro methyl-1,4-phenylene)ether, poly(2,6-di bromo methyl-1,4-phenylene)ether, poly(2,6-di phenyl-1,4-phenylene)ether, poly (2,6-di toluyl-1,4-phenylene) ether, poly(2,6-di chloro-1,4-phenylene)ether, poly(2,6-di benzyl-1,4-phenylene)ether, and poly(2,5-di methyl-1,4-phenylene)ether,
- (E) 10 to 80 weight percent of polystyrene polymer possessing syndiotactic structure, and
- (F) 10 to 80 weight percent of polystyrene resin other than component (B), wherein the total of (A), (B) and (C) is 100 weight percent.

* * * * *

UNITED STATES PATENT AND TRADEMARK OFFICE
CERTIFICATE OF CORRECTION

PATENT NO. : 6,849,695 B2  
APPLICATION NO. : 10/319162  
DATED : February 1, 2005  
INVENTOR(S) : Sho Sato Page 1 of 1

It is certified that error appears in the above-identified patent and that said Letters Patent is hereby corrected as shown below:

Column 3:
Line 14, before "resin(A)" insert -- group --

Column 5:
Line 11, after "graft" delete "polymer" and insert therefor -- polymers --
Line 15, before "racemic" delete "as" and insert therefor -- a --

Column 10:
Line 12, after "Methods" delete "is" and insert therefor -- are --

Column 12:
Line 67, before "is" delete "CD)" and insert therefor -- (D) --

Signed and Sealed this

Nineteenth Day of December, 2006

JON W. DUDAS
*Director of the United States Patent and Trademark Office*